United States Patent
Bordes, Jr.

[11] Patent Number: 5,927,000
[45] Date of Patent: Jul. 27, 1999

[54] TAMPER RESISTANT BAIT COVER AND BAIT ACCESS SYSTEM

[76] Inventor: Edgar S. Bordes, Jr., 4013 Clifford Dr., Metairie, La. 70002

[21] Appl. No.: 08/763,155

[22] Filed: Dec. 10, 1996

[51] Int. Cl.$^6$ .................................................. A01M 1/20
[52] U.S. Cl. ............................ 43/124; 43/131; 43/132.1; 52/101
[58] Field of Search .......................... 43/124, 131, 132.1; 285/338; 53/101, 514; 49/475.1, 463, 466; 138/89

[56]  References Cited

U.S. PATENT DOCUMENTS

| 613,246 | 11/1898 | Cole | 285/338 |
|---|---|---|---|
| 1,982,975 | 12/1934 | Aiken | 43/124 |
| 1,993,307 | 3/1935 | Nicholson | 285/338 |
| 2,059,095 | 10/1936 | Fellman | 43/124 |
| 2,155,491 | 4/1939 | Jacobs | 138/89 |
| 2,245,887 | 6/1941 | Wikander | 138/89 |
| 2,512,041 | 6/1950 | Steele | 138/89 |
| 2,970,348 | 2/1961 | Imus et al. | 43/131 |
| 2,993,616 | 7/1961 | Carlile, Jr. et al. | 138/89 |
| 3,291,156 | 12/1966 | Corsano | 138/89 |
| 3,618,809 | 11/1971 | Martino | 138/89 |
| 3,624,953 | 12/1971 | Crosby | 43/131 |
| 3,667,640 | 6/1972 | Morrow | 138/89 |
| 3,910,191 | 10/1975 | Williams | 138/89 |
| 4,040,215 | 8/1977 | Totsuka | 43/132.1 |
| 4,312,708 | 1/1982 | Leslie | 138/89 |
| 4,531,550 | 7/1985 | Gartner | 138/89 |
| 4,760,868 | 8/1988 | Saxon | 138/89 |
| 5,325,630 | 7/1994 | Allenbaugh | 49/463 |
| 5,329,726 | 7/1994 | Thorne et al. | 43/124 |
| 5,347,749 | 9/1994 | Chitwod et al. | 43/124 |
| 5,359,806 | 11/1994 | Jeffrey et al. | 43/131 |
| 5,378,086 | 1/1995 | Campbell, Jr. et al. | 43/124 |
| 5,427,417 | 6/1995 | Lechuga | 52/151 |
| 5,560,394 | 10/1996 | Jorgensen | 138/89 |

FOREIGN PATENT DOCUMENTS

| 2-6787 | 2/1990 | Japan . |
|---|---|---|
| WO 93/23998 | 12/1993 | WIPO . |

Primary Examiner—Michael J. Carone
Assistant Examiner—Darren Ark
Attorney, Agent, or Firm—Michael D. Carbo; Jacqueline M. Daspit

[57] ABSTRACT

A tamper resistant cover assembly for sealing bait access openings formed through buildings, concrete slabs, sidewalks, driveways, patios, parking lots, other similar structures, and trees, which structures and trees would ordinarily prevent direct access to sources of termite infestation. The tamper resistant cover assembly has a circumferentially expandable rubber bore gasket axially compressible between a top plate and a bottom plate. Axial compression is provided by screw means and causes circumferential expansion of the rubber gasket to seal the access openings. In a preferred embodiment, a tamper resistant bolt or screw is provided to create a flat top surface and to reduce the likelihood of cover assembly removal unless special tools are used. The cover assembly also allows for substantial separation of the cover assembly and the bait.

2 Claims, 6 Drawing Sheets

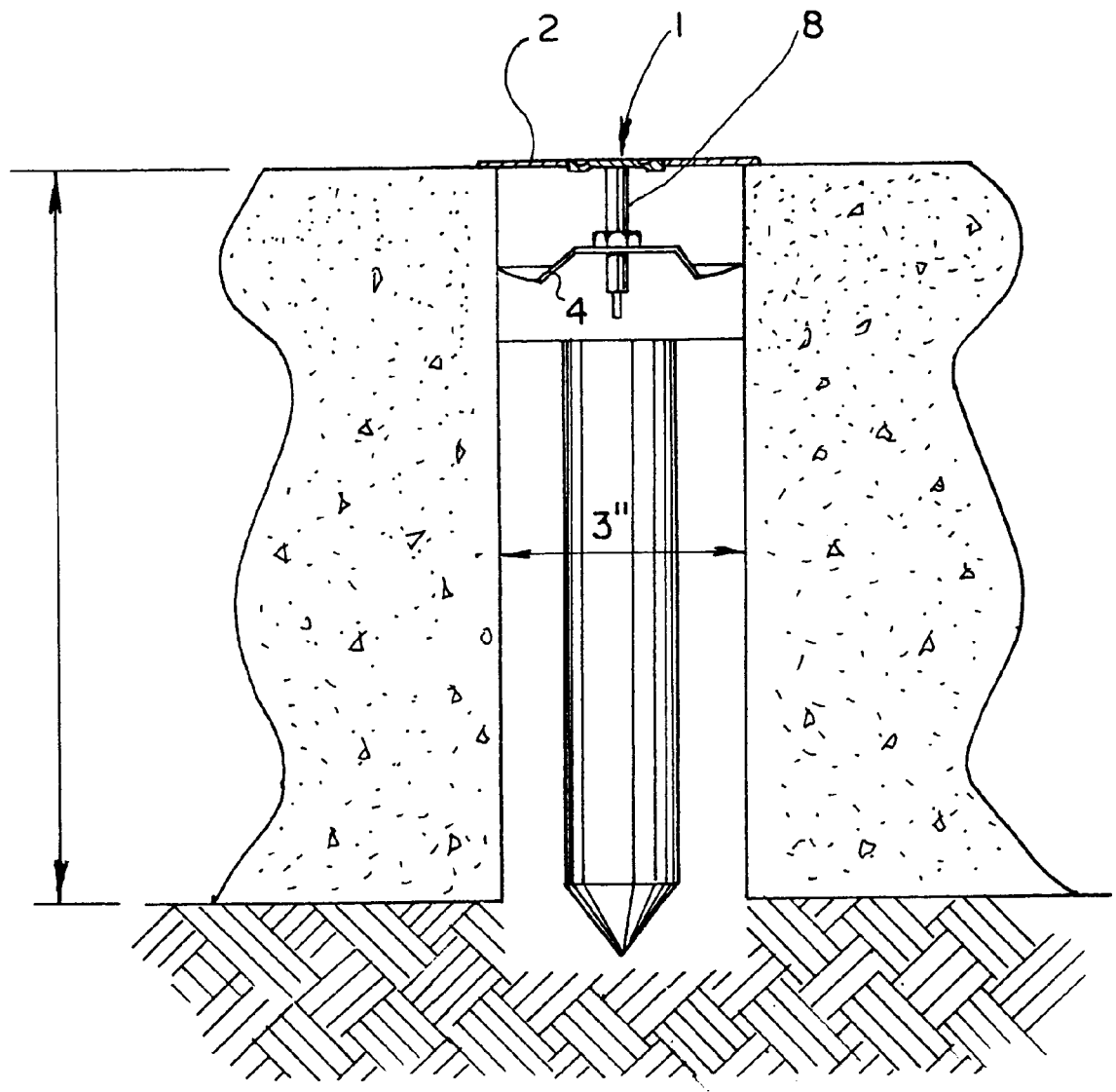
F I G. 4

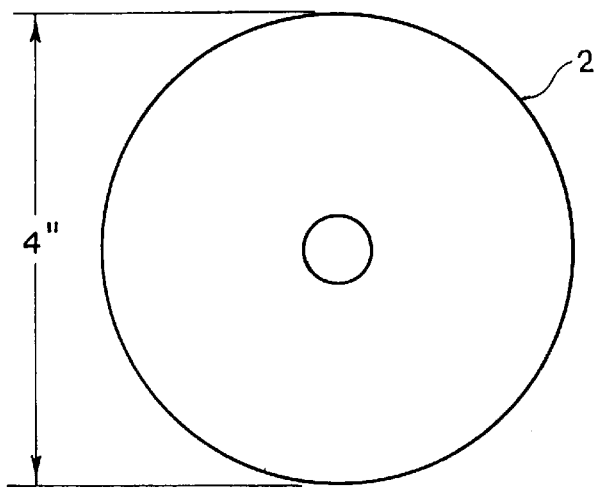
F I G. 5
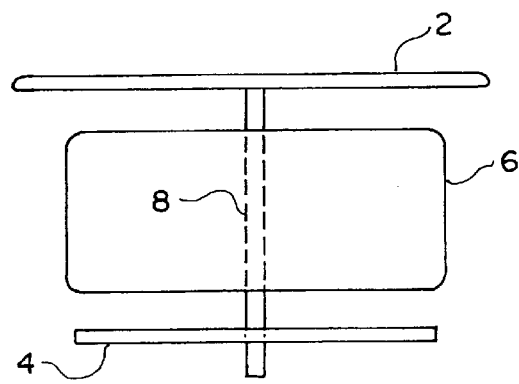
F I G. 6a
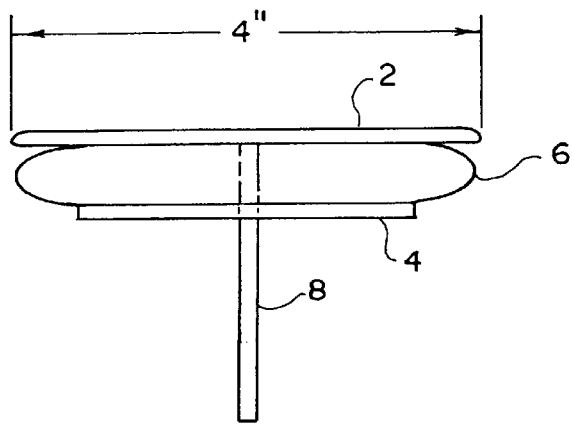
F I G. 6b

TAMPER RESISTANT BAIT COVER AND BAIT ACCESS SYSTEM

BACKGROUND OF THE INVENTION

The present invention relates to an improvement in termite control, and more particularly to an improved tamper resistant cover assembly for sealing a bait access opening in a structure or a tree and to a termite bait access system using the improved cover assembly.

The destructive nature of species of termites which ingest the wood of structures and other construction materials, as well as trees, is well known. The presence of termites and their onset of destructive activity is generally difficult to detect and control since termites are subterranean and forage cryptically, and destruction occurs internally in wooden structures and provides no external signs of damage until termite infestation is at a relatively advanced stage.

Current conventional control procedures for subterranean termites involve digging a trench around a structure to be protected, depositing a pesticide within the trench, and pressure injecting pesticides. Applications are also made from the inside of structures by drilling holes in slabs floors and footings and injecting termiticides. Such treatments are only prophylactic. Their goal is to provide a continuous chemical barrier between the structure and the termite colony in the soil. This procedure has several disadvantages. No means are provided for monitoring termite activity prior to depositing a pesticide within the soil, so the efficacy of the control procedure cannot be assessed. Additionally, the pesticide is deposited around a structure, often without knowledge of which areas are most at risk for infestation. It is extremely difficult to achieve a complete or uniform chemical barrier around the perimeter of and beneath a building, rendering the structure vulnerable to termites which find breaches in the application. Once the pesticide is applied to the soil, it cannot be removed. Finally, the termite colony likely remains viable foraging on food sources outside of the chemical barrier, thus poised to reinfest upon degradation of any portion of the chemical treatment.

Dry wood termites, which nest within the wooden structures they ingest, are likewise difficult to control. The currently dominant method of remedial control involves fumigation, or tightly tenting the entire structure and pumping in lethal concentrations of methyl bromide or Vikane gases. Preventive measures include using a chemically treated wood in the original construction, applying chemical "paints" (preservatives or pesticides) or other finishes to seal and protect cracks within wooden structures, or depositing a pesticide directly into wooden structures through holes for the purpose of internally applying the pesticide. These known methods provide no means for readily detecting termite infestation.

U.S. Pat. No. 5,329,726 to Thorne et al. discloses a perforated housing permanently implanted in a targeted terrain at or below ground level, and a perforated non-toxic bait cartridge removably received within the housing. The openings in the housing and the bait cartridge are oriented such that the respective openings are in alignment with each other when the cartridge is fully received within the housing in its operational position. The bait encourages feeding and thus reveals the presence of subterranean termites which will forage and burrow into the cartridge through the aligned openings in the cartridge and the housing. A cap is removably received on the top surface of the housing to close the housing.

U.S. Pat. No. 4, 945,673 to Lavelle discloses chambers which are permanently placed at various positions in the walls of a building in areas where pest control treatment is required. The chambers include a tubular duct having a proximal open end, which proximal open end may be provided with a cover plate to prevent children and pests from accessing any pest control substance within the chamber. Lavelle discloses attachment of the cover plate to the duct in a conventional manner.

The integrated structures disclosed in Thome et al. and in Lavelle do not allow for a sealed access opening where a bait tube or container is placed within the opening a substantial distance away from the access entrance opening.

Accordingly, it is an object of the present invention to provide a method of termite control which provides access to all possible termite nesting areas within the structure of a building.

A further object of the present invention is to provide a method of termite control that is safe for use in areas inhabited by humans, especially children, and pets and that will keep the termite control substances unexposed and safely contained within portions of a building.

Still another object of the present invention is to provide a method of termite control that is safe for use in areas inhabited by humans, especially children, and pets and to keep the termite control substances unexposed and safely contained within the interior of structures or trees.

Still another object of the present invention is to provide a method of termite control that does not interfere with the use of the premises to be treated.

A further object of the present invention to provide a system for termite control that is inexpensive and can easily be retrofit to existing buildings, structures, and surrounding areas.

SUMMARY OF THE INVENTION

These and other objects of the present invention are met by providing a method and system of termite control in which holes (also called bore holes) are placed through concrete, masonry, or other portions of structures, either during construction or retrofitted to existing buildings, bait is introduced into the passages formed by the holes, and a tamper resistant cover assembly according to the invention seals the access opening.

The cover assembly, in a preferred embodiment, has a round, flat top plate having a central hole and a tapered edge. A bottom plate is provided. A circumferentially expandable rubber bore-gasket is compressible between the top plate and the bottom plate. A countersunk threaded bolt having a flat head, with two depressions in the head to accept the tip of a spanner or a snake-eye screw driver, compresses the rubber bore-gasket between the top plate and the bottom plate. The cover assembly is sized so that when the bore-gasket is compressed it circumferentially expands to seal the opening. This protects the bait product from moisture, prevents lights infiltrating into the opening, and allows easy access to service the baits. The entire cover assembly is held in place by the friction between the rubber gasket and the side wall of a bore hole.

The present invention provides an improved system for both detecting termite activity in a target area, and thereafter suppressing termite infestation. A bore hole is introduced through concrete structures to allow access to soil that potentially contains subterranean termites. It has been discovered that subterranean termites form colonies which nest under concrete slabs. Conventionally baiting around the edges of slabs is often impractical to allow full coverage. A bait cartridge for other bait housing is removably received within the bore hole and positioned at the soil access opening of the bore hole. The bait cartridge or housing includes a highly preferred termite food, which encourages feeding and thus reveals the presence of subterranean termites which forage and burrow into the cartridge or other termite bait housing. Servicing of bait is required at periodic intervals, usually approximately one month intervals. During servicing, a bait cartridge or other housing is periodically removed from the bore hole to inspect for termite presence or activity. If no termite activity is detected, the bait cartridge is replaced within the bore hole to be monitored again at some time in the future.

Once termite activity is detected at the monitoring stations, pesticide containing bait cartridges are substituted for the non-toxic cartridges within each bore hole. If a bait cartridge as disclosed in U.S. Pat. No. 5,329,726 is used, the substitution of the pesticide containing cartridge for the non-toxic cartridge will not disturb pre-existing galleries or passageways established by termites to provide access between the termite colony and the openings in the outer housing of the control station because the outer housing remains fixed relative to the terrain and the openings in the pesticide cartridge remain in alignment with the openings in the housing. Accordingly, termites are provided with continuous access to the pesticide containing bait cartridge within the housing, thus permitting continuous feeding and the transport of pesticide-containing food to the termite colony through the pre-established connections between the colony and the bait stations. It is known that food is shared within termite colonies through regurgitation with nest mates.

The system according to the present invention permits diagnosing and monitoring termite activity in areas formerly inaccessible to conventional bait monitoring. The separation of the cover assembly from the rest of the ground bait system allows more precise monitoring than is afforded by discrete bait cartridges having their own covers attached thereto. In a preferred embodiment, a cylindrical rubber bore gasket is compressible along a longitudinal axis and, when compressed, expands circumferentially. Compression is provided by a threaded bolt which is inserted through the top plate, through the central hole of the gasket, and is threaded into or through the bottom plate to sandwich and compress the gasket when the bolt is tightened.

Preferably, the threaded bolt has a flat head, is countersunk within the top plate, and has two depressions in the head to accept the tip of a spanner or a snake-eye screwdriver. A battery driven screwdriver with a hex key can be used to insert a snake-eye head. Alternatively, a Phillips screwdriver with a central point can be used.

Preferably, the bottom plate is a plumber's blank that has been modified and is shaped so that when the bolt is tightened the rubber gasket does not collapse when the gasket is compressed between the two plates. Preferably, the bottom plate is of smaller diameter than the cover plate.

Typical bore gasket diameters range between one-half inch and four inches, although it is possible to go to larger diameters on the cover, on the order of five inches or more, when the system is used in asphalt.

Bait used can be any conventional termite poison. Hexaflumuron is the most widely commercially available termite bait.

The separation of the cover from the rest of the ground bait system allows access to potential termite infestations in soils, trees, walls, slabs, chain walls, and other structures, through a portion of such structures.

BRIEF DESCRIPTION OF THE DRAWINGS

FIG. 4 is a broken away side view of an embodiment of a tamper resistant cover assembly in place covering a bore hole in a structure;

FIG. 5 is a top view of an embodiment of a top plate;

FIG. 6(a) is a side view of an embodiment of a tamper resistant cover assembly in an uncompressed configuration;

FIG. 6(b) is a side view of an embodiment of a tamper resistant cover assembly in a compressed configuration;

DESCRIPTION OF THE PREFERRED EMBODIMENTS

Figure 1:
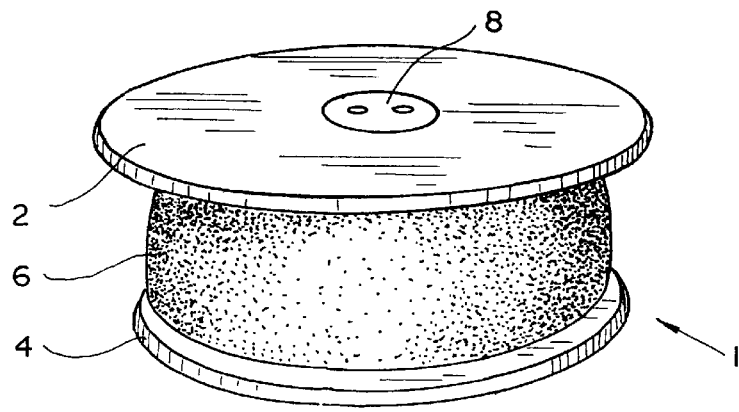
FIG. 1 is a perspective view of an embodiment of a tamper resistant cover assembly for use with a termite control bait system.
Figure 2:
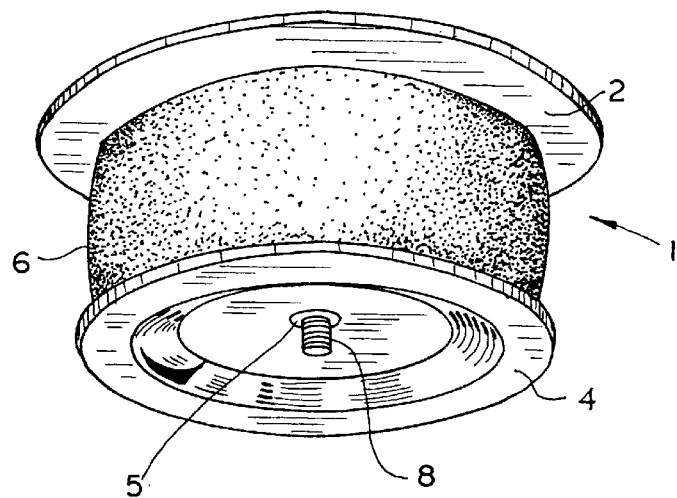
FIG. 2 is a perspective view of an embodiment of tamper resistant cover assembly for use with a termite control bait system.
Figure 3:
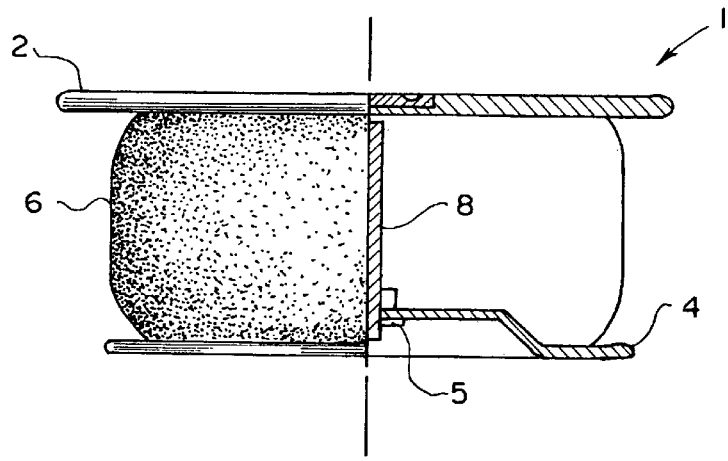
FIG. 3 is a side view of an embodiment of a tamper resistant cover assembly, shown with the gasket partially broken away, for use with a termite control bait system.

Referring to the drawing where like parts are given like referenced numerals cover assembly 1 includes top plate 2, botton plate 4 gasket 6, and bolt 8. Top plate 2 is preferably flat circular plate having a central aperture and a tapered edge. Bottom plan 4 is preferably a plumber's blank that has been shaped so that gasket 6 does not collapse when compressed between top plate 2 and bottom plate 4. Bottom plate 4 has a central aperture 5 and is preferably of smaller diameter than top plate 2.

Gasket 6 is preferably a substantially cylindrical rubber bore gasket that is compressible along its longitudinal axis and, when compressed, expands circumferentially. Compression of gasket 6 between top plate 2 and bottom plate 4 is provided by bolt 8, which preferably is threaded in at least the portion that engages bottom plate 4 through its central aperture.

Preferably, bolt 8 has a flat head, is countersunk within the top plate, and has two depressions in the head to accept the tip of a spanner or a snake-eye screwdriver.

In the method of the present invention, bore holes are cast or drilled through a concrete slab or other solid i,g., brick, asphalts, masonry, slate, and the like) structure in order to place bait in the soil below or on the other side of the concrete slab or other structure. The holes through the slab or other structure can be formed by the installation of a three-inch outer diameter heavy wall PVC pipe anchored into the soil with the proper size stake before the concrete is poured. A three-inch hole can also be drilled with a heavy-duty diamond concrete hole drill. This system works well for driveways, sidewalks, parking areas and any flat work that prevents direct access to the soil below. This system can be used in a preconstruction situation either through an exterior grade beam or through the floor of a slab under sinks, vanities, in closets, and even directly under finished floors.

A preconstruction system would preferably use a two-inch inside diameter pipe that would accommodate a one inch inside diameter replacement rod with bait 20 at the end of the rod. This preconstruction system will also access areas isolated by interior grade beams. Because of the thickness of exterior grade beams and the weight bearing requirements of outside chain walls, the area around an access hole may have to be supported with wire or construction bars, or a through-the-footing form could be modified to include sufficient wire bracing to support the structure above the chain wall.

EXAMPLE 1

Figure 7:
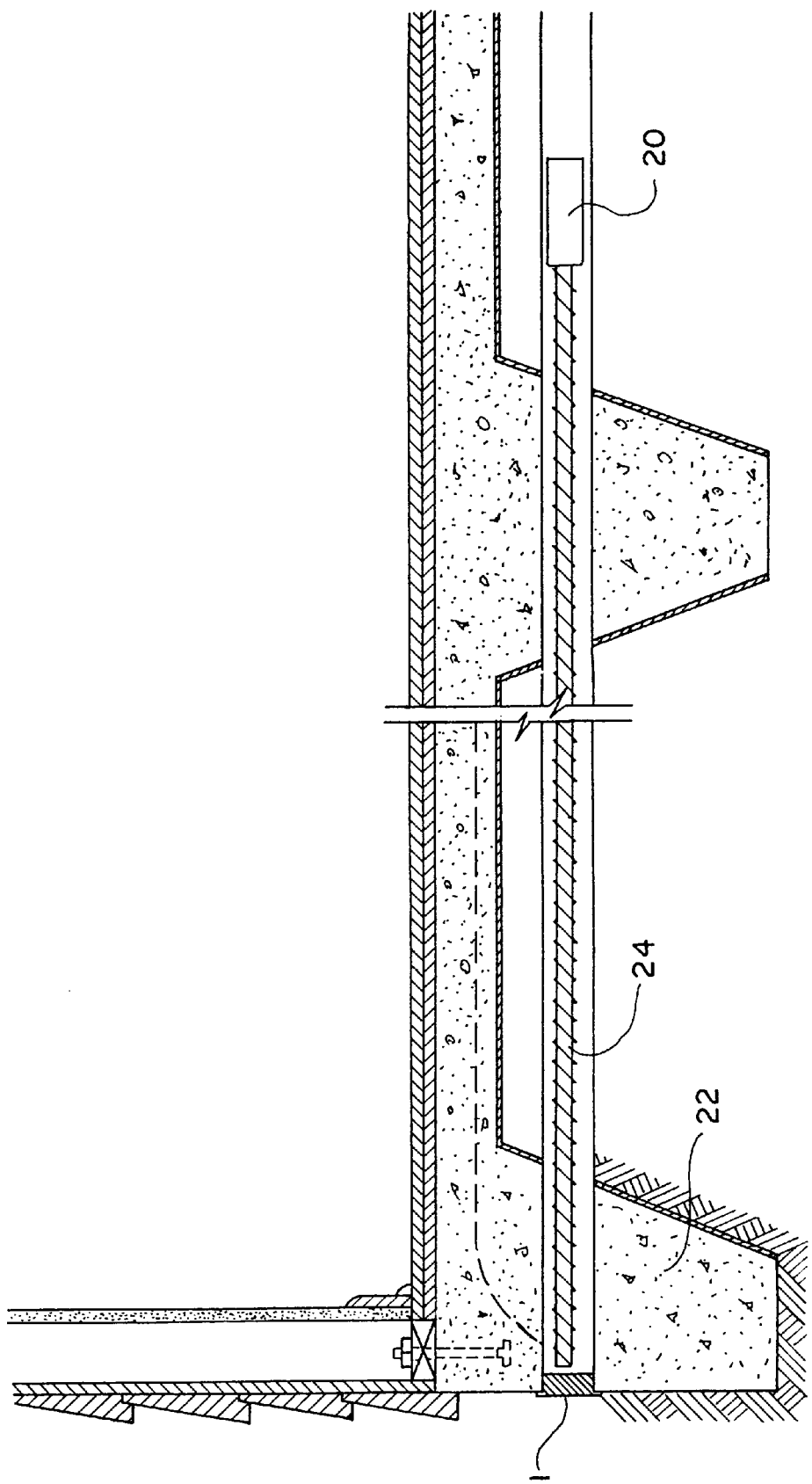
FIG. 7 shows a termite baiting system for preconstruction termite baiting for an isolated area within interior grade beams.

A termite baiting system for preconstruction termite baiting adjacent to exterior grade beams is shown in FIG. 7. Bait 20 is placed into an opening within reinforced concrete slab 22. cover assembly 1 seals the opening. Extendable bait holder 24 allows bait 20 to be easily inserted to a desired distance to reach an area of potential infestation, and to be easily removed.

EXAMPLE 2

Figure 8:
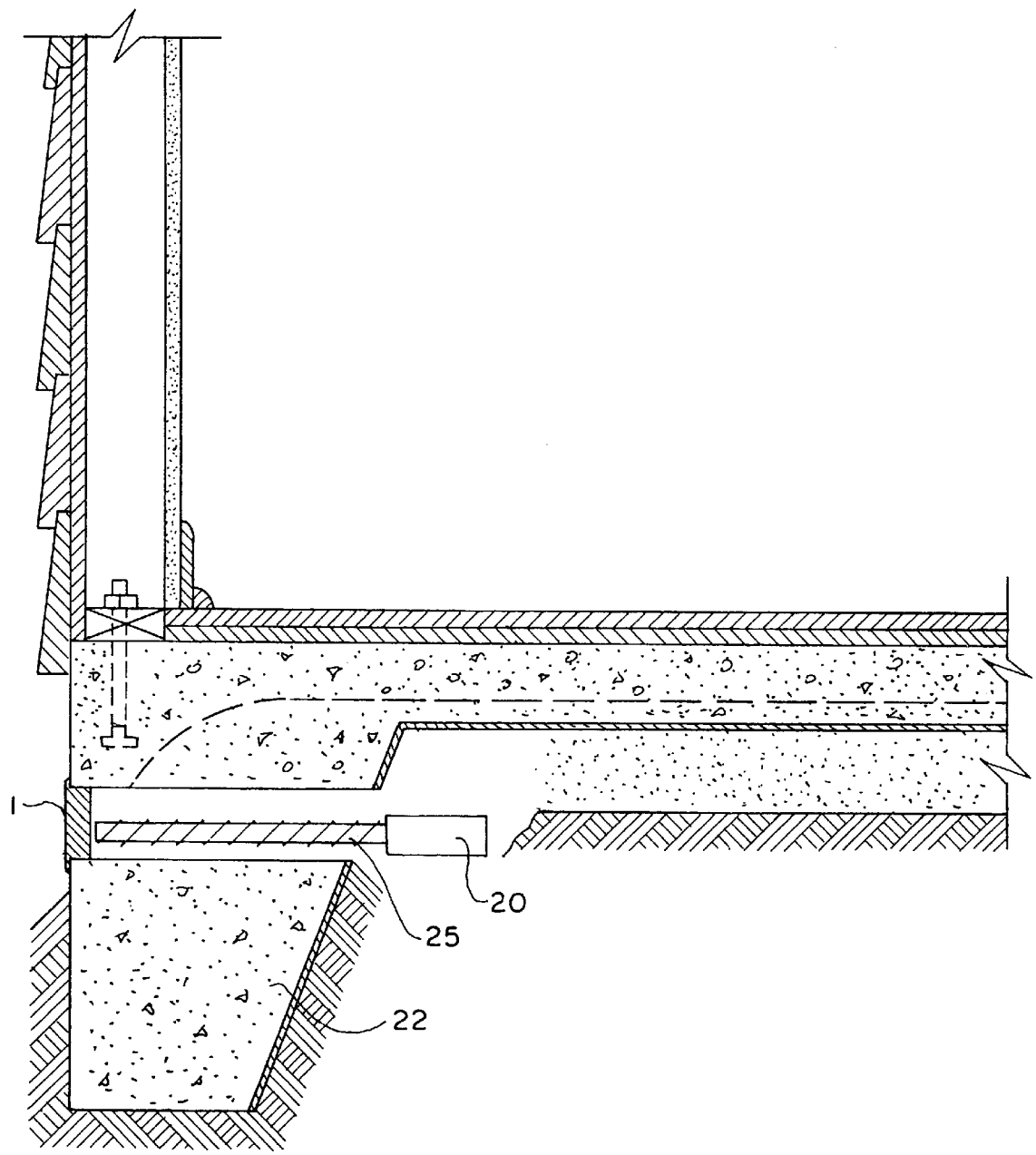
FIG. 8 shows a termite baiting system for preconstruction termite baiting through exterior grade beams.

FIG. 8 shows a preconstruction termite baiting system according to the invention for an area of isolated interior grade beams. Bait 20 is attached by PVC pipe 25 within a bore hole

EXAMPLE 3

The embodiments of the present invention of a method of termite control described above are set out by way.

Figure 9:
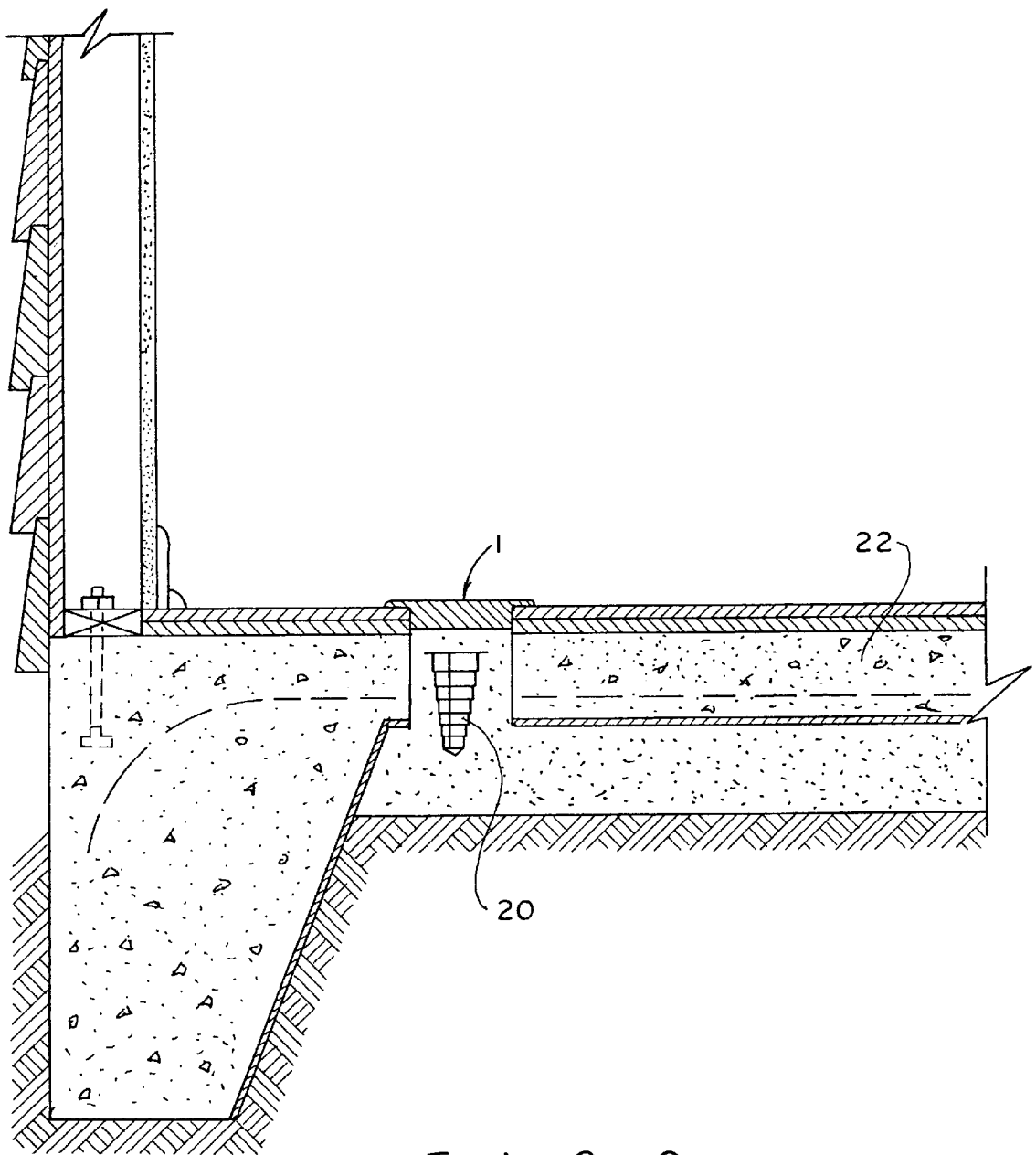
FIG. 9 shows a termite baiting system for preconstruction termite baiting vertically through a grade beam.

FIG. 9 shows a preconstruction termite baiting system according to the invention for termite baiting vertically through a grade beam of illustration but not of limitation. Many other embodiments which will be readily apparent to those skilled in the art may be made without materially departing form the spirit and scope of this invention.

what is claimed is:

1. A system for detecting and monitoring termite infestation, the system comprising:
   (a) a bait access opening through a structure or tree to a place of potential infestation;
   (b) bait material placed through the opening to the place of potential infestation;
   (c) a cover assembly for sealing the bait access openings formed through structures or trees, the cover assembly having a top plate having an axially aligned aperture therein, a bottom plate having an axially aligned aperture therein, a threaded bolt passing through the top plate aperture and connecting to the bottom plate aperture, the bolt being actuatable for reducing and extending the distance between the top plate and the bottom plate, and a bore gasket positioned between the top plate and the bottom plate, the gasket being axially compressible and circumferentially expandable as the distance between the top plate and the bottom plate is reduced, the cover assembly being placed in the opening to seal the opening.

2. A system for detecting and monitoring termite infestation, the system comprising:
   (a) a cover assembly for sealing termite bait access openings formed through structures, sidewalks and trees, the cover assembly comprising:
      a top plate having an axially aligned aperture therein;
      a bottom plate having an axially aligned aperture therein; a threaded tamper resistant bolt, countersunk into the top plate to present a substantially continuous top contour. passing through the top plate aperture and connecting to the bottom plate through at least a portion of the bottom plate aperture, the bolt being actuatable from above the top plate for reducing and extending the distance between the top plate and the bottom plate, the gasket being axially compressible and circumferentially expandable as the distance between the top plate and bottom plate is reduced; and the top plate circumference being greater than the circumference of the compressed bore gasket;
   (b) a bait access opening through a structure, sidewalk, or tree to a place of potential infestation;
   (c) a bait material placed through the opening to the place of potential infestation,
   wherein the cover assembly is then placed into the bait access opening to seal the bait access opening until the cover assembly is removed to detect and monitor termite activity.

* * * * *